US008626169B2

United States Patent
Lee et al.

(10) Patent No.: US 8,626,169 B2
(45) Date of Patent: Jan. 7, 2014

(54) METHOD OF HANDOVER AND BASE STATION INFORMATION TRANSMISSION IN WIRELESS COMMUNICATION SYSTEM

(75) Inventors: Jin Lee, Anyang-si (KR); In Uk Jung, Anyang-si (KR); Yong Ho Kim, Anyang-si (KR); Ki Seon Ryu, Anyang-si (KR)

(73) Assignee: LG Electronics Inc., Seoul (KR)

( * ) Notice: Subject to any disclaimer, the term of this patent is extended or adjusted under 35 U.S.C. 154(b) by 372 days.

(21) Appl. No.: 12/608,752

(22) Filed: Oct. 29, 2009

(65) Prior Publication Data

US 2010/0113032 A1 May 6, 2010

Related U.S. Application Data

(60) Provisional application No. 61/109,896, filed on Oct. 30, 2008.

(30) Foreign Application Priority Data

Mar. 9, 2009 (KR) ........................ 10-2009-0019586

(51) Int. Cl.
*H04W 36/00* (2009.01)
*H04M 3/16* (2006.01)

(52) U.S. Cl.
USPC .......................................... 455/437; 455/411

(58) Field of Classification Search
USPC .............. 455/437, 436, 411, 434, 418, 435.1; 370/328, 338, 329
See application file for complete search history.

(56) References Cited

U.S. PATENT DOCUMENTS

| 2004/0121774 | A1 | 6/2004 | Rajkotia et al. |
| 2005/0059437 | A1 | 3/2005 | Son et al. |
| 2007/0054667 | A1 | 3/2007 | Lee et al. |
| 2009/0047931 | A1* | 2/2009 | Nanda et al. ................... 455/411 |
| 2009/0052350 | A1* | 2/2009 | Chen et al. ..................... 370/255 |
| 2010/0009652 | A1 | 1/2010 | Hulkkonen et al. |
| 2011/0165878 | A1* | 7/2011 | Nylander et al. ............. 455/436 |

FOREIGN PATENT DOCUMENTS

| JP | 2002-532989 A | 10/2002 |
| JP | 2003-116166 A | 4/2003 |

(Continued)

OTHER PUBLICATIONS

NTT Docomo, "Cell ID Assignment for Home Node B", 3GPP TSG RAN WG1 Meeting #50, R1-073684, Aug. 20-24, 2007, 5 pages provided.

*Primary Examiner* — Michael Faragalla
(74) *Attorney, Agent, or Firm* — Birch, Stewart, Kolasch & Birch, LLP

(57) ABSTRACT

A method of handover in a wireless communication system is disclosed. A method of handover of a mobile station in a wireless communication system with femtocells comprises transmitting a control message including at least one among information of first femtocell base station detected through initial scanning and location information of the mobile station to a base station; receiving information of one or more second femtocell base stations to which the mobile station is accessible, wherein the second femtocell base stations are searched based on the control message from the base station; and performing a handover to one of the second femtocell base stations.

9 Claims, 9 Drawing Sheets

(56) References Cited

FOREIGN PATENT DOCUMENTS

| | | |
|---|---|---|
| JP | 2004-297482 A | 10/2004 |
| JP | 2009-232280 A | 10/2009 |
| KR | 10-2007-002393 A | 3/2007 |
| RU | 2296436 C2 | 3/2007 |
| WO | WO 2005/046273 * | 5/2005 ............... H04Q 7/32 |
| WO | WO 2005/046273 A1 | 5/2005 |
| WO | WO 2006/110307 A1 | 10/2006 |
| WO | WO 2007/040450 A1 | 4/2007 |
| WO | WO 2009/116427 A1 | 9/2009 |

* cited by examiner

METHOD OF HANDOVER AND BASE STATION INFORMATION TRANSMISSION IN WIRELESS COMMUNICATION SYSTEM

CROSS-REFERENCE TO RELATED APPLICATIONS

This application claims the benefit of the Korean Patent Application No. 10-2009-0019586, filed on Mar. 9, 2009, which are hereby incorporated by reference as if fully set forth herein.

This application also claims the benefit of U.S. Provisional Application Ser. No. 61/109,896, filed on Oct. 30, 2008, the content of which is hereby incorporated by reference herein in their entirety.

BACKGROUND OF THE INVENTION

1. Field of the Invention

The present invention relates to a wireless communication system and more particularly to a method of handover in a wireless communication system.

2. Discussion of the Related Art

There are hard handover (HHO) and soft handover in methods of handover according to related art. And there are Macro Diversity Handover (MDHO) and Fast Base Station Switching (FBSS) in soft handover. However, soft handover has large overhead. Thus, technology about hard handover is studied.

FIG. 1 illustrates procedure of hard handover according to related art. In FIG. 1, a serving base station (SBS) is what a mobile station is served by and a target base station (TBS) is what a mobile station is going to perform a handover to.

In hard handover according to related art, a mobile station previously synchronizes with a target base station to reduce communication interruption time during hard handover.

As illustrated in FIG. 1, a mobile station transmits a mobile station handover request (MOB_MSHO-REQ) message to a serving base station S110. Then, a serving base station transmits a handover request (HO-REQ) message to a target base station S120, and receives a handover response (HO_RSP) message S130. And, a serving base station transmits a handover response (MOB_BSHO_RSP) message to a mobile station as a response of the MOB_MSHO-REQ message of a mobile station S140. A mobile station acquires information of a target base station through the MOB_BSHO_RSP message, and prepares a previous procedure for handover, and transmits a handover indicate (MOB_HO_IND) message to a serving base station.

A base station changes communication setting according to a target base station, and waits for a Fast_Ranging_IE (information element) until action time. The Fast_Ranging_IE includes information for ranging process between a mobile station and a target base station. Action time is a time at which a target base station transmits the Fast_Ranging_IE to a mobile station.

After receiving the Fast_Ranging_IE, a mobile station performs an authentication and reopens communication.

A mobile station, a serving base station and a target base station buffer data to prevent loss of data during communication interruption, transmits and receiver the buffed data and continue communication. A mobile station starts buffering from transmitting the MOB_MSHO-REQ message, and a serving base station starts buffering from receiving the MOB_MSHO-REQ message.

Recently, technologies about femto cell for supporting indoor or shadow area which macro cell cannot support are being defined. A femto cell base station is a micromini and low power indoor base station. Femto cell is a coverage of a femto cell base station and similar concept with pico cell. Femto cell is evolved more than pico cell. A femto cell base station is a mini cellular base station connected to a broadband router and connects data to backbone network of a mobile communication company trough Digital Subscriber Line (DSL).

So, appearance of a femto cell base station makes method of handover to a femto cell base station necessary.

SUMMARY OF THE INVENTION

As previously stated above, according to the related art, a serving base station informs a mobile station of information of neighbor base stations which are candidates for handover. But, because there are too many femto cell base stations, overhead increases if a serving base station informs a mobile station of information of neighbor femto cell base stations. And a mobile station can be denied to access a femto cell base station according to an access type of the femto cell base station. Accordingly, handover method according to related art has a problem that a serving base station cannot efficiently inform a mobile station of information of femto cell base stations which are candidates for handover.

An object of the present invention is to provide an efficient method of handover.

An object of the present invention is to provide a method of handover, which can reduce overhead.

An object of the present invention is to provide a method of handover, according to which a serving base station can efficiently inform a mobile station of information of femto cell base stations which are candidates for handover.

Technical subject matters to be realized by embodiments of the present invention are not limited to the above-mentioned technical subject matters, and other technical subject matters not mentioned in the above-mentioned description may be easily appreciated by those skilled in the art to which the present invention pertains without difficulty.

In order to solve the above technical problems, a method of handover of a mobile station in a wireless communication system with femtocells comprises transmitting a control message including at least one among information of first femtocell base station detected through initial scanning and location information of the mobile station to a base station; receiving information of one or more second femtocell base stations to which the mobile station is accessible, wherein the second femtocell base stations are searched based on the control message from the base station; and performing a handover to one of the second femtocell base stations.

Also, the second femtocell base stations include an OSG (open subscriber group) femtocell base station and a CSG (closed subscriber group) femtocell base station.

Also, the information of one or more second femtocell base stations includes at least one among cell ID of each second femtocell base stations and information of frequency used by each second femtocell base stations.

Also, the second femtocell base stations exist around the first femtocell base station.

Also, the second femtocell base stations exist around the mobile station.

Also, the method further comprises receiving initial scanning interval for the initial scanning from the base station; and scanning neighbor femtocells during the initial scanning interval and detecting the first femtocell base station.

Also, the method further comprises performing a handover to a femtocell base station selected by scanning the second femtocell base stations.

In order to solve the above technical problems, a method of handover of a base station in a wireless communication system with femtocells comprises receiving a control message including at least one among information of first femtocell base station detected through initial scanning and location information of the mobile station from a mobile station; and transmitting information of one or more second femtocell base stations to which the mobile station is accessible, wherein the second femtocell base stations are searched base on the control message to the mobile station.

Also, the second femtocell base stations include an OSG (open subscriber group) femtocell base station and a CSG (closed subscriber group) femtocell base station.

Also, the second femtocell base stations exist around the first femtocell base station.

Also, the second femtocell base stations exist around the mobile station.

BRIEF DESCRIPTION OF THE DRAWINGS

The accompanying drawings, which are included to provide a further understanding of the invention, illustrate embodiments of the invention and together with the description serve to explain the principle of the invention.

In the drawings.

DETAILED DESCRIPTION OF THE INVENTION

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details. For example, the following description will be given centering on specific terms, but the present invention is not limited thereto and any other terms may be used to represent the same meanings. For convenience of description and better understanding of the present invention, some parts unrelated to the inventive concept of the present invention will be omitted herein. Wherever possible, the same reference numbers will be used throughout the drawings to refer to the same or like parts.

In the whole part of the specification of the present invention, if it is assumed that a certain part includes a certain component, the term 'including' means that a corresponding component may further include other components unless a specific meaning opposed to the corresponding component is written. In addition, another term ' . . . part', ' . . . unit', 'module' or the like means a unit for processing at least one function or operation, and this unit may be implemented by hardware, software, or a combination thereof.

Figure 1:
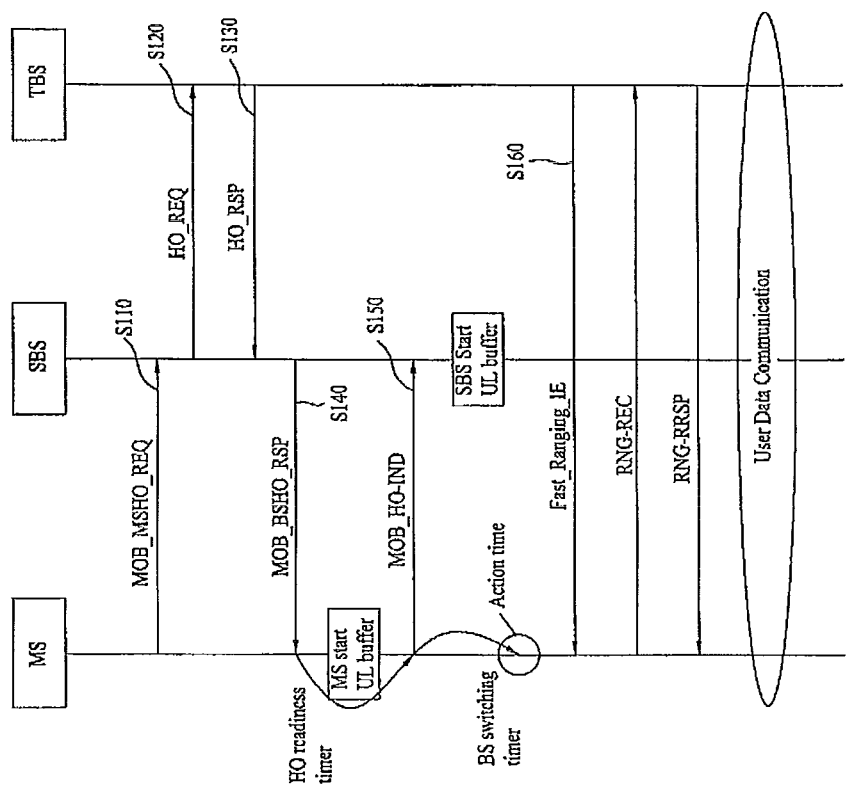
FIG. 1 illustrates procedure of hard handover according to related art.
Figure 2:
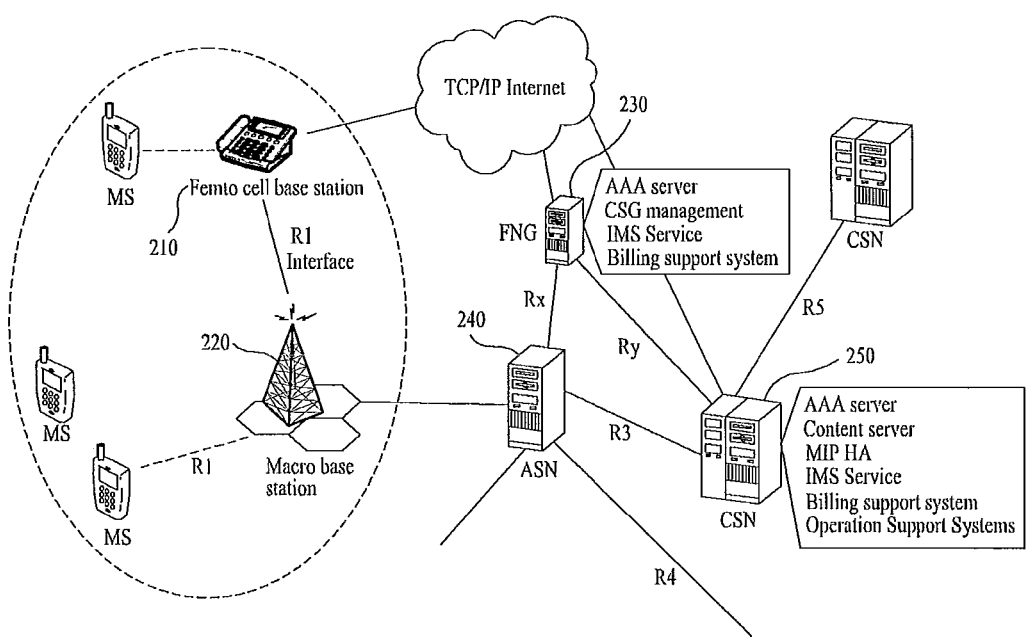
FIG. 2 is a schematic view illustrating a wireless communication system with femto cell base stations.

First, a wireless communication system with femto cell base stations will be described with reference to FIG. 2. FIG. 2 is a schematic view illustrating a wireless communication system with femto cell base stations.

Illustrated in FIG. 2, a wireless communication system with femto cell base stations comprises a femto cell base station 210, a macro base station 220, a femto network gateway (FNG) 230, an access service network (ASN) 240 and a connectivity service network (CSN) 250. A macro base station 220 is a general base station of a previous wireless communication system.

A femto cell base station 210 is a mini version of a macro base station and performs most functions of a macro base station. A femto cell base station 210 connects directly to a transmission control protocol/internet protocol (TCP/IP) network, operates independently like a macro base station 220. Coverage of a femto cell base station is about 0.1~30 m and a femto cell base station can accepts 10~20 mobile stations. Frequency used by a femto cell base station 210 can use same or different from that used by a macro base station 220.

A femto cell base station 210 connects to a macro base station 220 through R1 interface so to receive downlink channel from a macro base station 220 and transmit control signal to a macro base station 220.

A femto cell base station 210 can cover indoor or shadow area which a macro base station cannot cover and support high data rate transmission. A femto cell base station 210 can be established as overlay in macro cell area or as non-overlay in area which a macro base station does not cover.

There are two types of a femto cell base station 210. One type is a closed subscriber group (CSG) femto cell base station and another type is an open subscriber group (OSG) femto cell base station. A CSG femto cell base station groups mobile stations which is accessible to the CSG femto cell base station, grants the mobile stations CSG identification (ID) and allow the only mobile stations granted CSG ID to access to the CSG femto cell base station. An OSG femto cell base station is a base station which all mobile station can access.

A FNG 230 controls a femto cell base station 210 and connects to an ASN 240 and a CSN 250 through Rx and Ry interface respectively. A femto cell base station 210 can be served by a CSN 250 through a FNG 230. A mobile station connected to a femto cell base station 210 can be authenticated by a FNG 230 or a CSN 250.

A CSN 250 provides a mobile station authentication, charging function and an application service like internet and VoIP. And an ASN 240 controls a macro base station 220 and manages connection of a macro base station 220 and a CSN 250.

Next, a method of handover according to embodiments of the present invention will hereinafter be described with reference to FIGS. A handover initiated by a mobile station will be described in first embodiment of the present invention and a handover initiated by a serving base station will be described in first embodiment of the present invention.

A method of handover according to first embodiment of the present invention will be described with reference to FIGS. 3 to 6.

Figure 3:
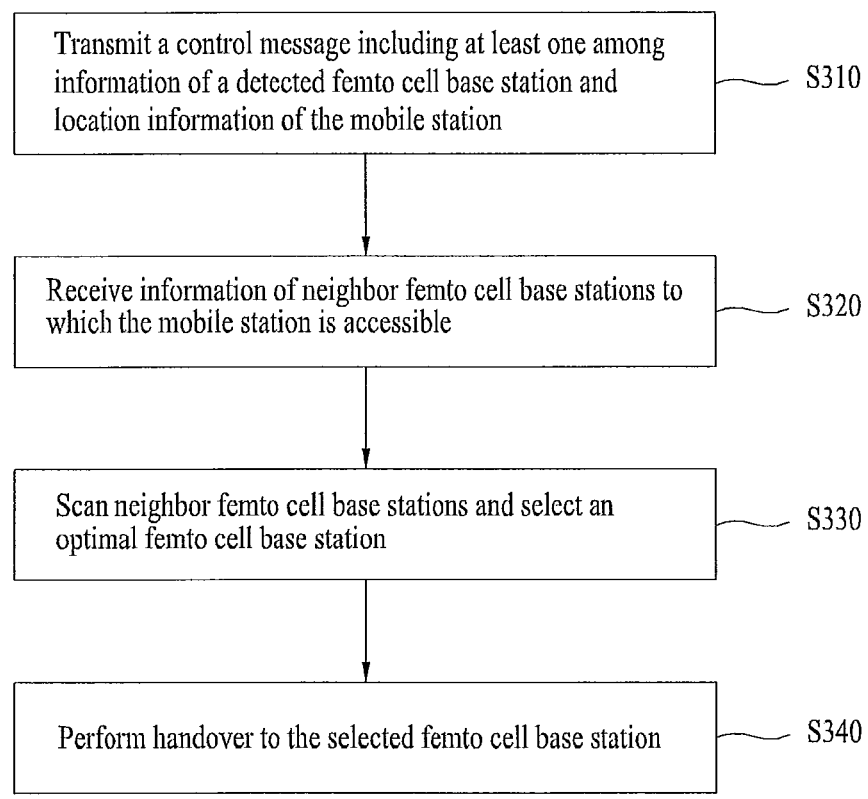
FIG. 3 is a flow chart illustrating a method of handover according to first embodiment of the present invention.

FIG. 3 is a flow chart illustrating a method of handover according to first embodiment of the present invention. FIG. 3 illustrates process which objects of a wireless communication system perform in a method of handover according to first embodiment of the present invention.

As illustrated in FIG. 3, if a mobile station predicts handover to a femto cell base station, it transmits a control message including at least one among information of a femtocell base station detected through initial scanning and location information of the mobile station to a serving base station S310.

A mobile station predicts handover to a femto cell base station with various criterions.

Signal strength of a femto cell base station or approach to a femto cell can be criterions to predict handover. For example, a mobile station receives downlink signal of a femto cell base station when move to femto cell, and predicts handover if strength of received signal from a femto cell base station is over threshold. At this time, trigger condition like a type of femto cell base station can be given. For example, a mobile station does not predict handover if a femto cell base station is a CSG femto cell base station, and a mobile station predicts handover if a femto cell base station is a OSG femto cell base station.

If a mobile station predicts handover to a femto cell base station, it transmits a control message including information of a femtocell base station detected, location information of the mobile station or all of them to a serving base station.

Figure 4:
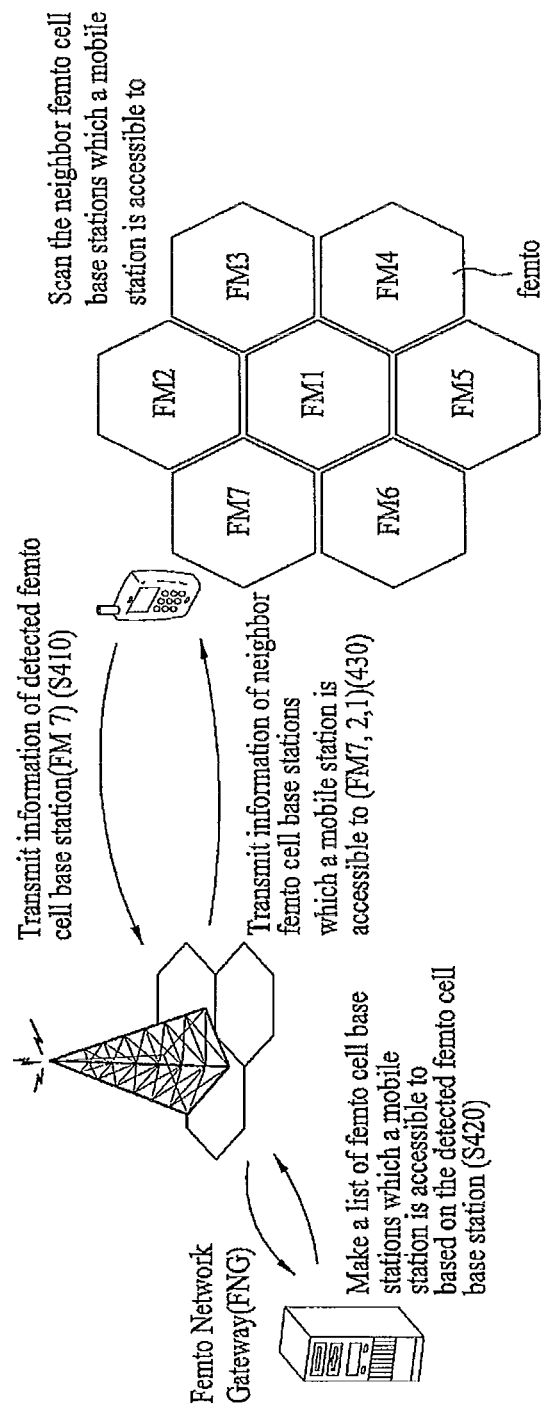
FIG. 4 illustrates processes which each object performs in a method of handover according to first embodiment of the present invention.

FIG. 4 illustrates processes which each object performs in a method of handover according to first embodiment of the present invention.

In FIG. 4, a mobile station detects a neighbor femto cell base station, FM 7 and transmits a control message including information of FM 7 to a serving base station. Then, a serving base station can estimate a location of FM 7 as knowing topology information of femto cell base stations which are in coverage of a serving base station. So, a serving base station transmits information needed for scanning to a mobile station, wherein the information includes system information and frequency information of FM7, FM2 and FM 1 which exist around a mobile station and allow a mobile station to access. Then, a mobile station scans only femto cell base stations whose information is received from a serving base station.

Figure 5:
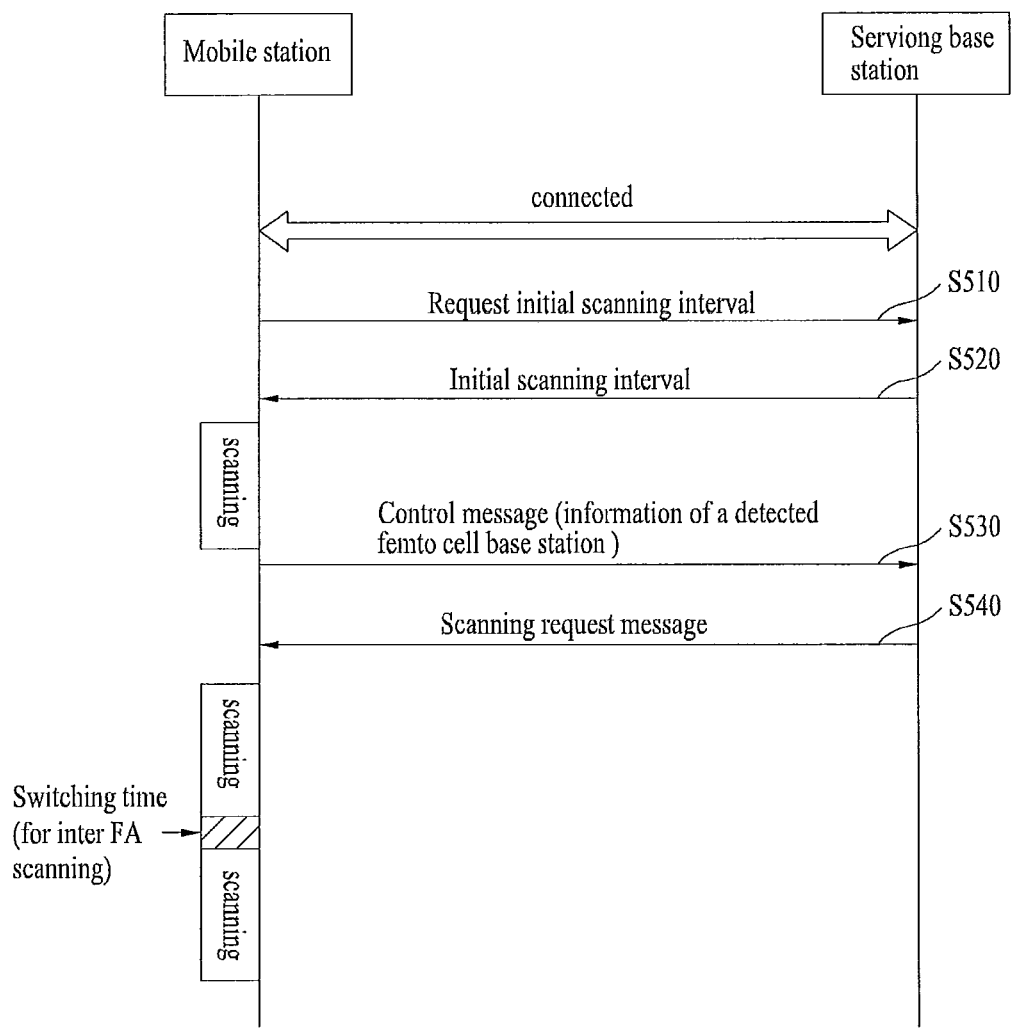
FIG. 5 illustrates a handover process in case that a mobile station transmits a control message including information of detected femto cell base station.
Figure 6:
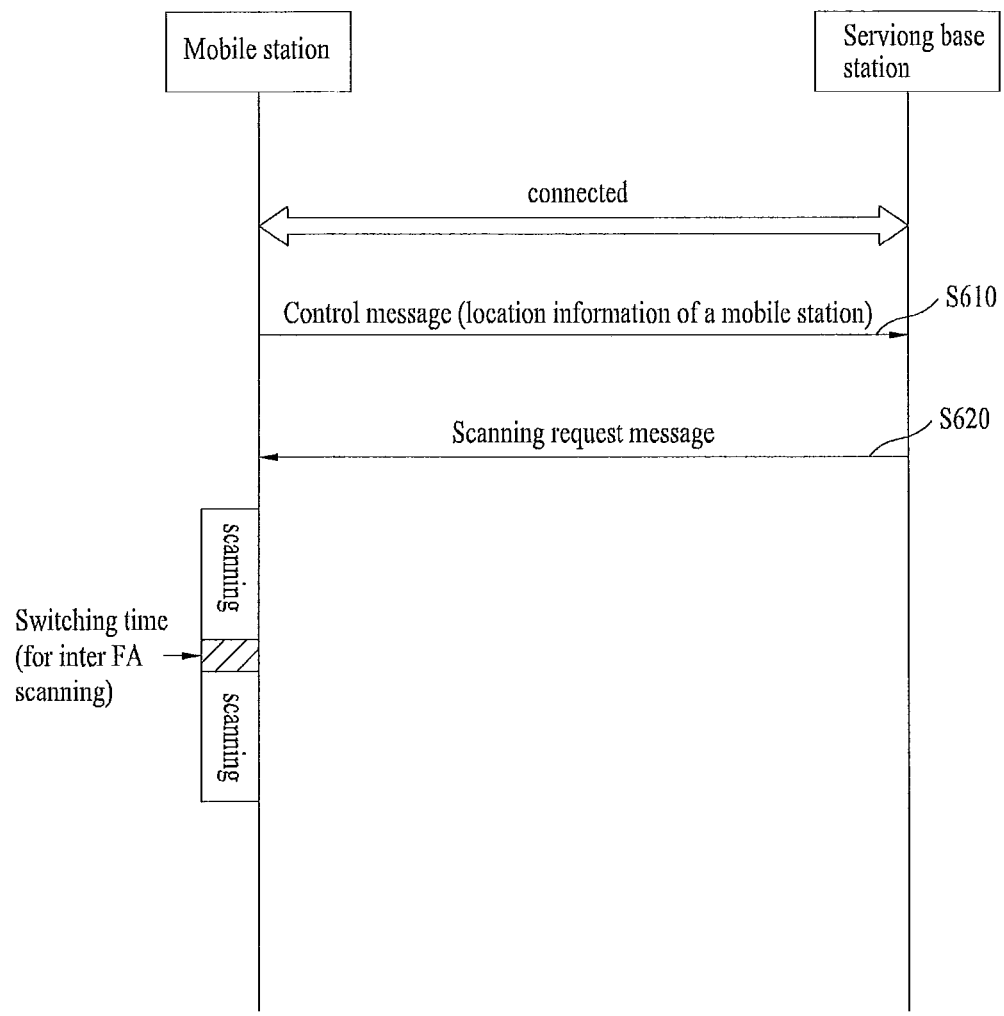
FIG. 6 illustrates a handover process in case that a mobile station transmits a control message including information of location of a mobile station.

FIG. 5 illustrates a handover process in case that a mobile station transmits a control message including information of detected femto cell base station. FIG. 6 illustrates a handover process in case that a mobile station transmits a control message including information of location of a mobile station.

In case that a mobile station transmits a control message including information of detected femto cell base station, a mobile station performs initial scanning for searching a femto cell base station. Therefore, as illustrated in FIG. 5, if a mobile station predict handover to a femto cell base station, a mobile station requests initial scanning interval to a serving base station S510. When communicating with a serving base station by specific frequency, a mobile station cannot detect femto cell base stations which use different frequency from the specific frequency. So, a mobile station has to scan different frequency from the specific frequency, however a mobile station can not communicate with a serving base station during scanning the different frequency. So, a mobile station scans during period allowed by a serving base station. The period allowed is the initial scanning interval.

After receiving request of a mobile station, a base station assigns the initial scanning interval to a mobile station S520. At this time, if a serving base station knows a location of a mobile station, a serving base station can transmits a list of neighbor femto cell base stations and information of frequency used by the neighbor femto cell base stations to a mobile station. But, generally a serving base station does not know a location of a mobile station. The initial scanning interval is generally shorter than normal scanning interval.

A mobile station scan femto cell base stations during the initial scanning interval and transmits a control message including information of detected femto cell base station to a serving base station S530. When performing initial scanning, a mobile station can scan same or different frequency band from frequency band used in communication with a serving base station.

Figure 7:
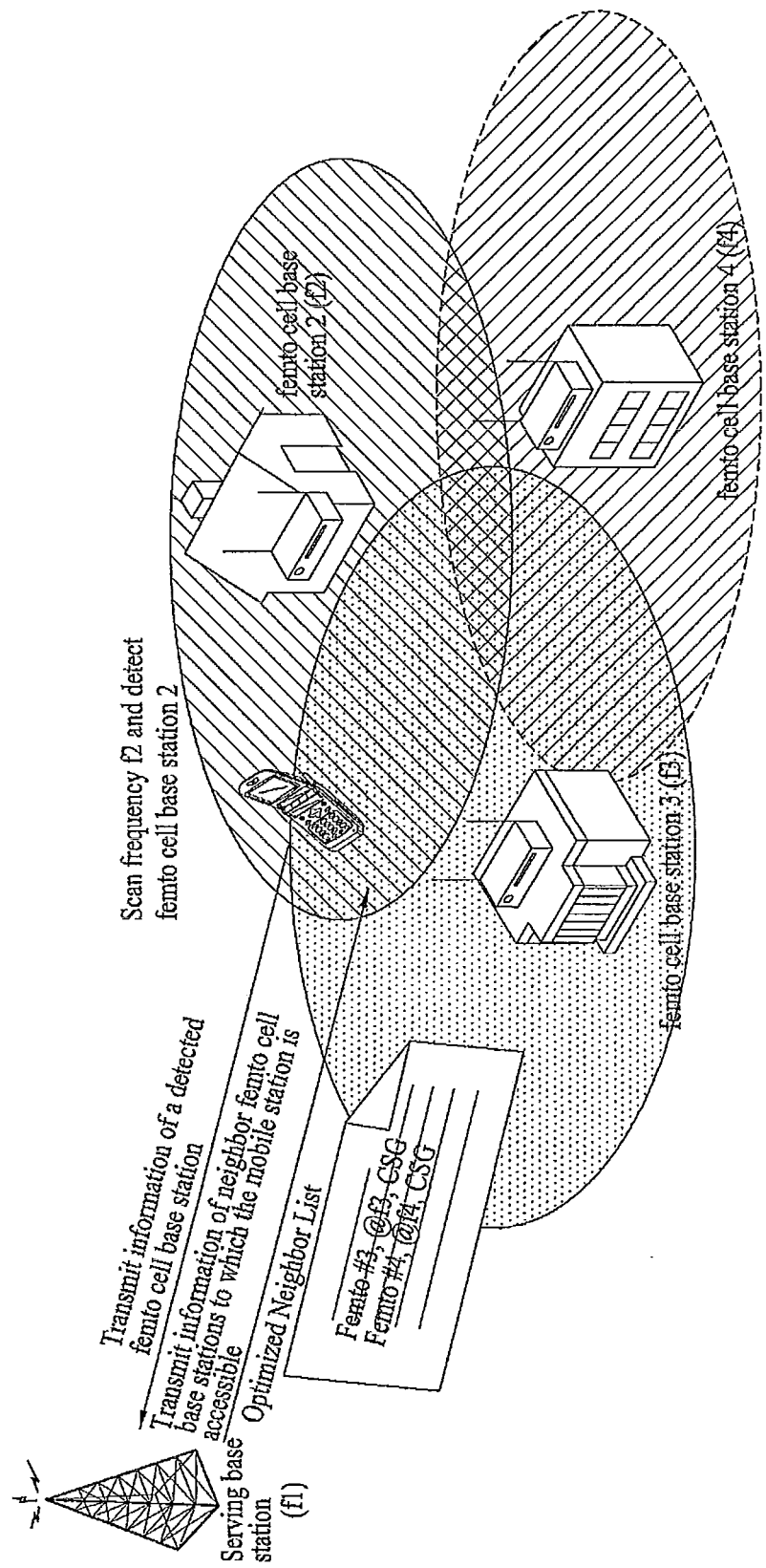
FIG. 7 illustrates a case that a mobile station scans different frequency band from frequency band used in communication with a serving base station during initial scanning.

FIG. 7 illustrates a case that a mobile station scans different frequency band from frequency band used in communication with a serving base station during initial scanning. As illustrated in FIG. 7, when communicating with a serving base station by frequency band central frequency of which is f1, a mobile station initially scans frequency band whose central frequency is f2, detects femto cell base station 2 and transmits a control message including information of femto cell base station 2 to a serving base station. Then, a serving base station searches femto cell base station 3 which uses frequency band whose central frequency is f3 and femto cell base station 4 which uses frequency band whose central frequency is f4. And a serving base station informs a mobile station of information of femto cell base station 3 and 4.

Or during initial scanning, a mobile station can scan same frequency band as frequency band used in communication with a serving base station. That is, in FIG. 7, in case that femto cell base station 2 use frequency band whose central frequency is f1, a mobile station initially scans frequency band whose central frequency is f1, detects femto cell base station 2 and transmits a control message including information of femto cell base station 2 to a serving base station. Then, a serving base station searches femto cell base station 3 which uses frequency band whose central frequency is f3 and femto cell base station 4 which uses frequency band whose central frequency is f4. And a serving base station informs a mobile station of information of femto cell base station 3 and 4. The information of femto cell base station 3 and 4 includes system information.

Information of a detected femto cell base station can include base station ID of the detected femto cell base station, result of channel estimation and information of frequency used by a detected femto cell base station. At this time, a control message can include location information of a mobile station.

In case that a mobile station transmits a control message which includes not information of a detected base station but location information of a mobile station, a mobile station need not perform initial scanning. So, as illustrated in FIG. 6, a mobile station does not perform steps of requesting initial scanning interval and receiving initial scanning interval. If a mobile station predicts handover to a femto cell base station, a mobile station transmits a control message including location information of a mobile station to a serving base station S610. Then, a serving base station makes a list of neighbor femto cell base stations based on the location information of a mobile station and requests scanning as transmitting information of the neighbor femto cell base stations to a mobile station S620. Information of the neighbor femto cell base stations can include base station ID, central frequency and system information.

Referring to FIG. 3, a mobile station receives information of neighbor femtocell base stations to which the mobile station is accessible from a base station S320. At this time, a base station can request a mobile station to scan the neighbor femtocell base stations and assign scanning interval.

A serving base station makes a list of neighbor femto cell base stations to which the mobile station is accessible based on information of detected femto cell base station or location information of a mobile station included in a control message. That is, in case that a serving base station makes a list based on information of detected femto cell base station, a serving base station makes a list of femto cell base stations which exist around the detected femtocell base station. In case that a serving base station makes a list based on location information of a mobile station, a serving base station makes a list of femto cell base stations which exist around the mobile station.

A mobile station can access to OSG femto cell base stations and CSG femto cell base stations which allow the mobile station to access. That is, a mobile station can handover only neighbor femto cell base stations which allow the mobile station to access.

When making a list of neighbor femto cell base stations to which the mobile station is accessible, a serving base station can use information which a serving base station already know or information which is received from a FNG through a backbone network.

As illustrated in FIG. 4, a serving base station makes a list of neighbor femto cell base stations to which the mobile station is accessible communicating with a FNG through a backbone network S420. And a serving base station transmits information of femto cell base stations (FM 7, 2, 1) of the list to a mobile station S430.

A serving base station transmits information of femto cell base stations of the list to a mobile station. The information of femto cell base stations can include at least one among cell ID of each femto cell base stations and information of frequency used by each femto cell base stations.

A mobile station scans neighbor femto cell base stations to which the mobile station is accessible during scanning interval and selects an optimal femto cell base station S330.

And a mobile station performs handover to the selected femto cell base station S340. A mobile station transmits a handover request message to a serving base station and receives a handover response message from a serving base station and performs handover to the selected femto cell base station.

Next, a method of handover according to second embodiment of the present invention will be described with reference to FIGS. 8 and 9. In second embodiment of the present invention, handover is initiated by a serving base station.

A method of handover according to second embodiment of the present invention in case that a serving base station does not request a mobile station initial scanning will be described with reference to FIG. 8. And a method of handover according to second embodiment of the present invention in case that a serving base station requests a mobile station initial scanning will be described with reference to FIG. 9.

Figure 8:
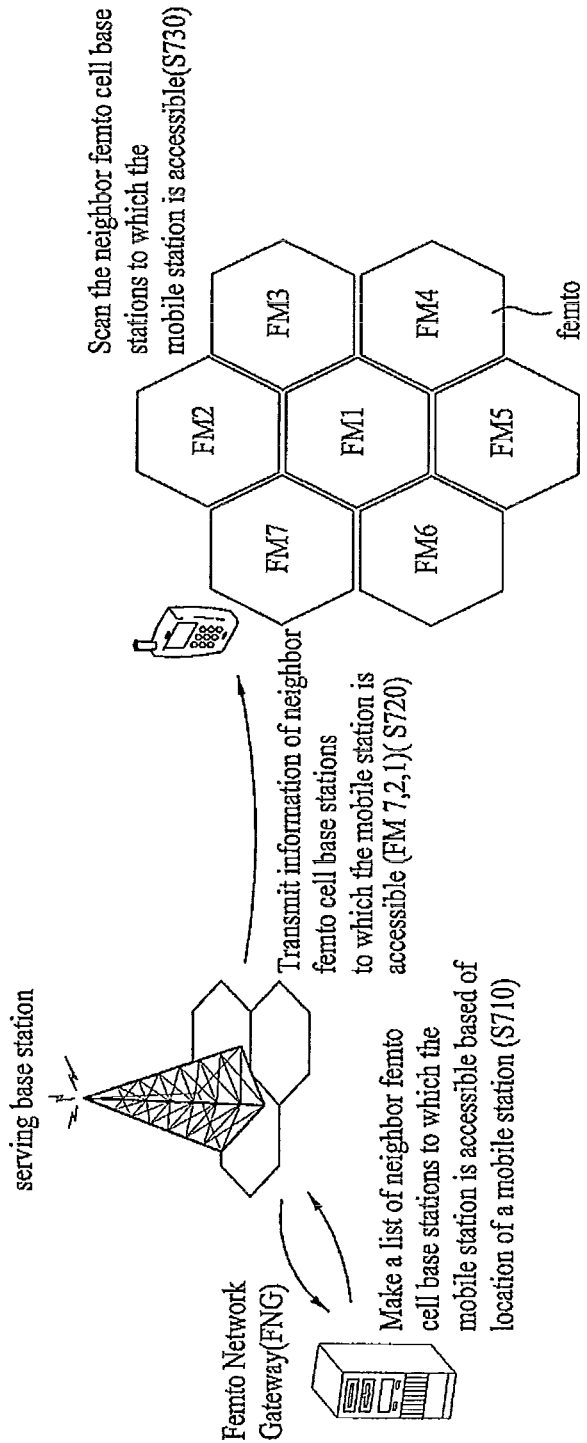
FIG. 8 illustrates a method of handover according to second embodiment of the present invention in case that a serving base station does not request a mobile station initial scanning.

FIG. 8 illustrates a method of handover according to second embodiment of the present invention in case that a serving base station does not request a mobile station initial scanning.

As illustrated in FIG. 8, a serving base station makes a list of neighbor femto cell base stations to which a mobile station is accessible based on a location of a mobile station S810. That is, a serving base station makes a list of femto cell base stations which exist around a mobile station and allow a mobile station to access.

When making a list of neighbor femto cell base stations to which a mobile station is accessible, a serving base station use information which a serving base station already knows or information acquired from a FNG through a backbone network.

A serving base station transmits information of femtocell base stations (FM7, 2, 1) of a list to a mobile station and requests a mobile station to scan. At this time a serving base station can assign a mobile station scanning interval. And, the information of femtocell base stations can include a list of neighbor femtocell base stations which a mobile station is accessible to and information of frequency used each of the neighbor femtocell base stations.

And, a serving base station can order a mobile station to perform handover to an optimal femtocell base station. Then, a mobile station performs handover to the optimal femtocell base station without performing a step S830.

A mobile station scans femtocell base stations of the received list for scanning interval and selects an optimal femtocell base station and performs handover to the optimal femtocell base station S830.

Figure 9:
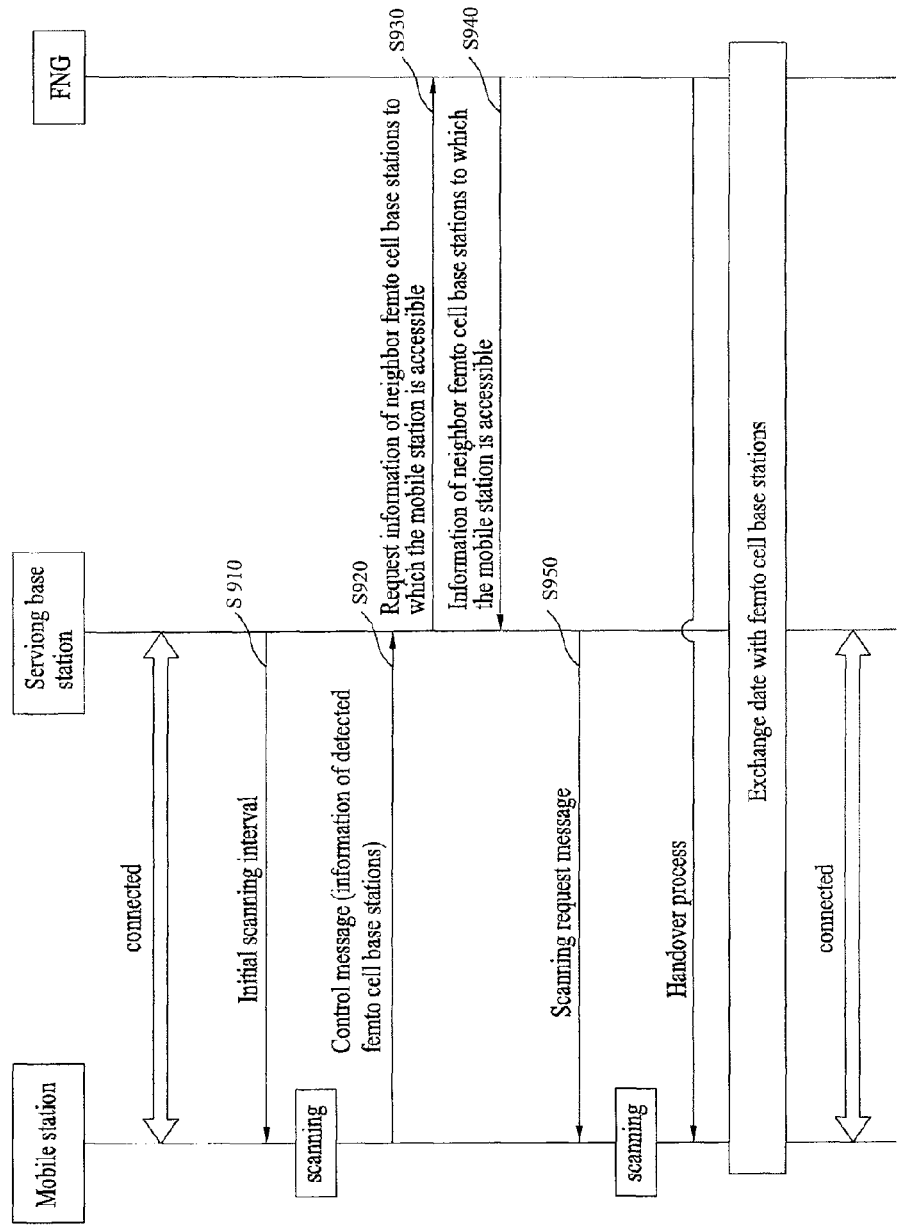
FIG. 9 illustrates a method of handover according to second embodiment of the present invention in case that a serving base station requests a mobile station initial scanning.

FIG. 9 illustrates a method of handover according to second embodiment of the present invention in case that a serving base station requests a mobile station initial scanning.

As illustrated in FIG. 9, a serving base station assigns a mobile station initial scanning interval to request initial scanning S910.

Then, a mobile station scan femtocell base stations for initial scanning interval and transmits a control message including information of a detected femtocell base station S920. At this time, the information of a detected femtocell base station can be a preamble of a base station ID of the detected femtocell base station. And, a mobile station can include location information of the mobile station into the control message.

A serving base station transmits a mobile station a scanning request message including information of neighbor femtocell base stations to which the mobile station is accessible S950.

A serving base station makes a list of neighbor femtocell base stations to which the mobile station is accessible based on information of a detected femtocell base station of the received control message. That is, the neighbor femtocell base stations exist around the detected femtocell base station. At this time, a serving base station makes the list using information which a serving base station already knows. Or, a serving base station requests information of neighbor femtocell base stations to which the mobile station is accessible to a FNG S930, and receives the information S940.

The scanning request message can include a list of neighbor femtocell base stations to which the mobile station is accessible and information of frequency used by each of the neighbor femtocell base stations. A serving base station can assign a mobile station a scanning interval.

A mobile station scans femtocell base stations of the list during the scanning interval, selects optimal femtocell base station and performs handover to the optimal femtocell base station. Then, a mobile station disconnects with a serving base station.

The embodiments of the present invention may be achieved by various means, for example, hardware, firmware, software, or a combination thereof. In a hardware configuration, the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the embodiments of the present invention may be achieved by a module, a procedure, a function, etc. performing the above-described functions or operations. Software code may be stored in a memory unit and driven by a processor. The memory unit may be located at the interior or exterior of the processor and may transmit data to and receive data from the processor via various known means.

It will be apparent to those skilled in the art that various modifications and variations can be made in the present invention without departing from the spirit or scope of the invention. Therefore, the above-mentioned detailed description must be considered only for illustrative purposes instead of restrictive purposes. The scope of the present invention must be decided by a rational analysis of the claims, and all modifications within equivalent ranges of the present invention are contained in the scope of the present invention.

It is apparent that the present invention may be embodied by a combination of claims which do not have an explicit cited relation in the appended claims or may include new claims by amendment after application.

According to the embodiments of the present invention, the following advantages can be obtained.

First of all, since a serving base station informs a mobile station of information of neighbor femto cell base stations which allow access of the mobile station, overhead decreases.

Second, since a serving base station efficiently informs a mobile station of information of femto cell base stations which are candidates for handover, handover delay decreases.

It is to be understood that the advantages that can be obtained by the present invention are not limited to the aforementioned advantages and other advantages which are not mentioned will be apparent from the following description to the person with an ordinary skill in the art to which the present invention pertains.

What is claimed is:

1. A method of performing a handover at a mobile station (MS) in a wireless communication system, the method comprising:
transmitting, by the MS to a serving base station (serving BS), a message for a scanning request including a preamble index of a detected at least one femto base station (femto BS);
receiving a scanning interval and a list of at least one accessible neighbor femto BS by the MS from the serving BS,
wherein the list of the at least one accessible neighbor femto BS is formed based on the preamble index;
scanning by the MS for the at least one accessible neighbor femto BS in accordance with the scanning interval;
transmitting, to the serving BS by the MS, a message including an identifier of at least one femto BS detected by the MS through the scanning, frequency information of a frequency used by the detected at least one femto BS and a measurement result for the detected at least one femto BS;
receiving, by the MS from the serving BS, a list of at least one femto BS in response to the message,
wherein the list of the at least one femto BS is formed based on the frequency information, the measurement result, or the identifier; and
performing by the MS a handover to a femto BS of the at least one femto BS in the list.

2. The method according to claim 1, wherein the list of at least one accessible neighbor femto BS includes at least one of an open subscriber group (OSG) femto BS and a closed subscriber group (CSG) femto BS.

3. The method according to claim 1, wherein the at least one accessible neighbor femto BS exists around the at least one femto BS detected by the MS through the scanning.

4. A method of performing a handover at a base station (BS) in a wireless communication system, the method comprising:
receiving, from a mobile station (MS) by the BS, a message for a scanning request including a preamble index of a detected at least one femto base station (femto BS);
transmitting a scanning interval and a list of at least one accessible neighbor femto BS by the BS to the mobile station,
wherein the list of the at least one accessible neighbor femto BS is formed based on the preamble index;
receiving, from the MS by the BS, a message including an identifier of at least one femto BS detected by the MS through scanning, frequency information of a frequency used by the detected at least one femto BS and a measurement result for the detected at least one femto BS;
transmitting, to the MS by the BS, a list of at least one femto BS in response to the message,
wherein the list of at least one femto BS is formed based on the frequency information, the measurement result, or the identifier.

5. The method according to claim 4, wherein the list of the at least one accessible neighbor femto BS includes at least one of a subscriber group (OSG) femto BS and a closed subscriber group (CSG) femto BS.

6. The method according to claim 4, wherein the at least one accessible neighbor femto BS exists around the at least one femto BS detected by the MS through the scanning.

7. The method according to claim 1, wherein the serving BS is a macro base station.

8. A mobile station (MS) configured to perform a handover in a wireless communication system, the MS comprising:
a processor configured to
transmit, to a serving base station (serving BS), a message for a scanning request including a preamble index of a detected at least one femto base station (femto BS),
receive a scanning interval and a list of at least one accessible neighbor femto BS from the serving BS, wherein the list of the at least one accessible neighbor femto BS is formed based on the preamble index,
scan for the at least one accessible neighbor femto BS in accordance with the scanning interval,
transmit, to the BS, a message including an identifier of at least one femto BS detected by the MS through scanning, frequency information of a frequency used by the detected at least one femto BS and a measurement result for the detected at least one femto BS,
receive, from the serving BS, a list of at least one femto BS in response to the message,
wherein the list of the at least one BS is based on the frequency information, the measurement result or the identifier, and
perform a handover to a femto BS of the at least one femto BS in the list.

9. A base station (BS) configured to perform a handover in a wireless communication system, the BS comprising:
a processor configured to
- receive, from a mobile station (MS), a message for a scanning request including a preamble index of a detected at least one femto base station (femto BS),
- transmit a scanning interval and a list of at least one accessible neighbor femto BS from the serving BS, wherein the list of the at least one accessible neighbor femto BS is formed based on the preamble index,
- receive, from the MS, a message including an identifier of at least one femto BS detected by the MS through scanning, frequency information of a frequency used by the detected at least one femto BS and a measurement result for the detected at least one femto BS, and
- in response to the message, transmit, to the MS, a list of at least one femto BS, wherein the list of the at least one femto BS is based on the frequency information, the measurement result, or the identifier.

* * * * *